United States Patent
Furuhashi et al.

(10) Patent No.: US 6,806,934 B2
(45) Date of Patent: Oct. 19, 2004

(54) TRANSFLECTIVE LIQUID CRYSTAL DISPLAY HAVING DIELECTRIC MULTILAYER IN LCD CELLS

(75) Inventors: Hiroyuki Furuhashi, Tainan (TW); Chung Kuang Wei, Tainan (TW); Chao Wen Wu, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 30 days.

(21) Appl. No.: 10/143,972

(22) Filed: May 14, 2002

(65) Prior Publication Data

US 2003/0020856 A1 Jan. 30, 2003

(30) Foreign Application Priority Data

Jul. 27, 2001 (TW) ........................................ 90118822 A

(51) Int. Cl.[7] ........................ G02F 1/1343; G02F 1/136; G02F 1/1335; H01L 29/04
(52) U.S. Cl. ............................. 349/139; 349/42; 349/96; 349/112; 349/114; 349/117; 257/59; 257/72
(58) Field of Search ............................... 349/113, 122, 349/138, 155, 96, 112, 114, 117, 42, 43; 257/59, 72

(56) References Cited

U.S. PATENT DOCUMENTS

| | | | | |
|---|---|---|---|---|
| 4,040,727 A | * | 8/1977 | Ketchpel | ................... 349/114 |
| 4,315,258 A | * | 2/1982 | McKnight et al. | ............ 345/87 |
| 5,526,149 A | * | 6/1996 | Kanbe et al. | ................ 349/113 |
| 5,627,667 A | * | 5/1997 | Mizushima et al. | ........ 349/124 |
| 5,708,486 A | * | 1/1998 | Miyawaki et al. | ............ 349/44 |
| 5,714,247 A | * | 2/1998 | Kuo et al. | ................... 428/323 |
| 5,936,688 A | * | 8/1999 | Tsuda et al. | ................. 349/113 |
| 6,184,956 B1 | * | 2/2001 | Kang et al. | ................. 349/113 |
| 6,426,787 B1 | * | 7/2002 | Satake et al. | ............... 349/138 |
| 2001/0035928 A1 | * | 11/2001 | Kuroiwa et al. | ............ 349/115 |
| 2002/0001047 A1 | * | 1/2002 | Park et al. | ..................... 349/43 |
| 2002/0093610 A1 | * | 7/2002 | Furukawa et al. | .......... 349/113 |
| 2002/0171794 A1 | * | 11/2002 | Nakamura et al. | .......... 349/117 |
| 2003/0098931 A1 | * | 5/2003 | Saiki et al. | ..................... 349/1 |

* cited by examiner

*Primary Examiner*—Tarifur R. Chowdhury

(57) ABSTRACT

A liquid crystal display (LCD) includes a dielectric multilayer formed inside an LCD cell and a light source behind the LCD cell wherein an image is generated by the LCD in accordance with input video signals when either ambient light is incident on the surface of the dielectric multilayer or when light is generated by the light source. The LCD cell has a first substrate and a second substrate being located facing each other with a liquid crystal layer therebetween. The dielectric multilayer includes multiple layers of transparent dielectric materials with different refractive index. In the LCD of the present invention, since the dielectric multilayer is formed inside the LCD cell, the light only passes through one of the substrates in the reflective mode thereby increasing efficiency while meeting the need for low power consumption.

19 Claims, 15 Drawing Sheets

TRANSFLECTIVE LIQUID CRYSTAL DISPLAY HAVING DIELECTRIC MULTILAYER IN LCD CELLS

BACKGROUND OF THE INVENTION

1. Field of the Invention

This invention relates to Liquid Crystal Display (LCD) and in particular to LCDs of the transflective type.

2. Description of the Related Art

LCDs can be classified based upon the source of illumination. Reflective type displays are illuminated by ambient light that enters the display from the front and the peripheral side. A reflective surface, such as an aluminum or silver reflector placed in or behind the reflective display, reflects the light to illuminate the reflective display. Although reflective displays meet the need for low power consumption, the displays often appear rather dark and are therefore difficult to read. In addition, the ambient light from the front and the peripheral side is not always enough to illuminate the reflective displays, and, thus, the application of the reflective displays will be limited.

In applications where the intensity of ambient light is insufficient for viewing, supplemental lighting, such as a backlight assembly, is used to illuminate the display. Although supplemental lighting can illuminate a display regardless of ambient lighting conditions, it is an expensive drain on battery life. Thus, the batteries on portable computers, for example, must typically be recharged after 2 to 4 hours of continuous backlight use. In applications where the intensity of ambient light is very strong, e.g., under an outdoor burning sun, the transmissive image illuminated only by the backlight assembly is insufficient for viewing because of poor contrast.

In an attempt to overcome the above described drawbacks of reflective and transmissive displays, some electronic displays have been designed to use ambient light when available and backlighting only when necessary. This dual function of reflection and transmission leads to the designation, "transflective". Transflective LCDs are a dual mode display device. These devices operate either with the available ambient light in a reflective mode or with an internal backlight in a transmissive mode.

FIG. 15 illustrates a conventional transflective LCD. In the reflective mode, the ambient light 10 passes through the outside polarizer 20, and then passes into the LCD cell 30. Generally, the LCD cell 30 consists of two opposing glass substrates 32, 34 with a liquid crystal layer 36 sandwiched therebetween. Typically, the substrate 34 is provided with a plurality of pixel regions arranged as a matrix with a switching element such as TFT and a pixel electrode (not shown) formed at every pixel region. The substrate 32 is provided with color filters for displaying colors and a common electrode (not shown). While the liquid crystal layer having positive dielectric anisotropy is possible, for the sake of simplicity, it will be assumed that the liquid crystal layer has the more popular negative dielectric anisotropy. Thus, when the switching element is in the "on" state, the liquid crystal layer has no effect upon the light passing through it. When the switching element is "off", the light passing though the liquid crystal layer will be altered in some way, depending upon the nature of the light and the type of LCD. The light 10 passing through the LCD cell 30 proceeds through the inside polarizer 40 to the transflective film 50 serving as a reflector of ambient light and a transmitter of light from the backlight. At the transflective film 50, a portion of the light is reflected. The reflected light 10 then returns through the inside polarizer 40, through the LCD cell 30 and finally through the outside polarizer 40 to a viewer.

Since the transflective film 50 is placed outside the LCD cell 30, reflections from the interface between the liquid crystal layer 36 and the glass substrate 34 as well as the transflective film 50 will form a multiple image, which can cause serious problem depending on the thickness of the glass and adversely affect the display resolution. Furthermore, in the reflective mode, the light passes through the polarizers 20 and 40 twice; however, in the transmission mode, the light passes through the polarizers 20 and 40 only once. Apparently, the conventional transflective LCD is not efficient in the reflective mode. The efficiency is important because the size, weight and battery life of portable instrumentation are heavily dependent upon the efficiency of the instrumentation's display.

Accordingly, there exists a need in the art for a transflective liquid crystal display which overcomes, or at least reduces the above-mentioned problems of the prior art.

SUMMARY OF THE INVENTION

It is an object of the present invention to provide transflective LCDs which are more efficient and have low power consumption in the reflective mode.

To achieve the above listed and other objects, the present invention provides a liquid crystal display (LCD) characterized by having a dielectric multilayer formed inside an LCD cell so as to overcome, or at least reduce the above-mentioned problems of the prior art. The dielectric multilayer is composed of multiple layers of transparent dielectric materials with different refractive index. The LCD cell is sandwiched between two polarizers and comprises a first substrate and a second substrate being located facing each other with a liquid crystal layer therebetween. When the light traveling through the dielectric multilayer encounters material with different refractive index, a great part of the light is reflected while the other part is transmitted. The dielectric multilayer may be disposed between the first substrate and the liquid crystal layer or between the second substrate and the liquid crystal layer such that the light only passes through one of the polarizers in the reflective mode thereby increasing efficiency while meeting the need for low power consumption.

In a general aspect of the present invention, the first substrate is provided with a plurality of gate lines formed parallel to one another, a plurality of data lines formed parallel to one another vertically to the gate lines, a plurality of switching elements and pixel electrodes, and a passivation layer formed on the switching elements and pixel electrodes. The gate lines and the data lines are arranged to form a matrix of pixel regions with each of the pixel regions bounded by two adjacent gate lines and two adjacent data lines. The switching elements are formed at intersections of the gate lines and data lines, and the pixel electrodes are formed in the pixel regions. The passivation layer has a plurality of contact holes. The second substrate is provided with a light-shielding matrix, a plurality of color filters and a common electrode. A first polarizer, a retardation film, and a second polarizer on the retardation film are disposed outside of the LCD cell. A backlight is disposed behind the LCD cell.

According to a preferred embodiment of the present invention, the dielectric multilayer is directly formed on one surface of the first substrate, the gate lines are formed on the dielectric multilayer, and the light source is disposed behind the other surface of the first substrate. In this embodiment, the LCD cell may include an overcoat layer formed on the passivation layer. The overcoat layer has a plurality of contact holes to expose the contact holes of the passivation layer. The pixel electrodes are formed on the overcoat layer and electrically connected to the switching elements through the contact holes of the passivation layer and the contact holes of the overcoat layer.

According to another preferred embodiment of the present invention, the dielectric multilayer is formed on the gate lines as an insulating layer.

According to still another preferred embodiment of the present invention, the dielectric multilayer is formed between the switching elements and the pixel electrodes as a passivation layer. The dielectric multilayer has a plurality of contact holes, and the pixel electrodes are electrically connected to the switching elements through the contact holes of the dielectric multilayer.

According to still another preferred embodiment of the present invention, the dielectric multilayer is formed on an overcoat layer and the pixel electrodes. The overcoat layer is formed on the passivation layer and has a plurality of contact holes to expose the contact holes of the passivation layer. The pixel electrodes are formed between the overcoat layer and the dielectric multilayer, and the pixel electrodes are electrically connected to the switching elements through the contact holes of the passivation layer and the contact holes of the overcoat layer.

According to still another preferred embodiment of the present invention, the dielectric multilayer is formed on an overcoat layer and has a plurality of contact holes-formed corresponding to the contact holes of the passivation layer. The overcoat layer is formed between the passivation layer and the dielectric multilayer. The pixel electrodes are formed on the dielectric multilayer and electrically connected to the switching elements through the contact holes of the dielectric multilayer.

In the embodiments described above, the liquid crystal display may further includes a diffuser. The diffuser may be disposed inside or outside the LCD cell. Preferably, the diffuser is formed on the outer surface of the second substrate, and the retardation film is formed on the diffuser. Alternatively, the diffuser may be sandwiched between the common electrode and the color filters, and the retardation film is formed on the outer surface of the second substrate.

According to still another preferred embodiment of the present invention, the dielectric multilayer is formed on the inner surface of the second substrate, the first polarizer is formed on the outer surface of the second substrate, and the light source is behind the second substrate. In this embodiment, the liquid crystal display may further include a diffuser and a retardation film. The diffuser may be disposed inside or outside the LCD cell. Preferably, the diffuser is formed on the outer surface of the first substrate, and the retardation film is formed on the diffuser. Alternatively, the diffuser may be sandwiched between the common electrode and the color filters, and the retardation film is formed on the outer surface of the second substrate. Furthermore, the diffuser may be sandwiched between the pixel electrodes and the passivation layer, and the retardation film is directly formed on the outer surface of the first substrate.

According to still another preferred embodiment of the present invention, the dielectric multilayer is formed on an overcoat layer with an uneven surface (such as a corrugated surface) closest to the liquid crystal layer and the pixel electrodes. The overcoat layer is formed on the passivation layer and has a plurality of contact holes to expose the contact holes of the passivation layer. The pixel electrodes are sandwiched between the uneven surface of the overcoat layer and the dielectric multilayer, and are electrically connected to the switching elements through the contact holes of the passivation layer and the contact holes of the overcoat layer.

According to still another preferred embodiment of the present invention, the dielectric multilayer is formed on an overcoat layer with an uneven surface (such as a corrugated surface) closest to the liquid crystal layer. The overcoat layer is formed on the passivation layer and has a plurality of contact holes to expose the contact holes of the passivation layer. The dielectric multilayer has contact holes formed corresponding to the contact holes of the passivation layer. The pixel electrodes are formed on the dielectric multilayer and electrically connected to the switching elements through the contact holes of the dielectric multilayer.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
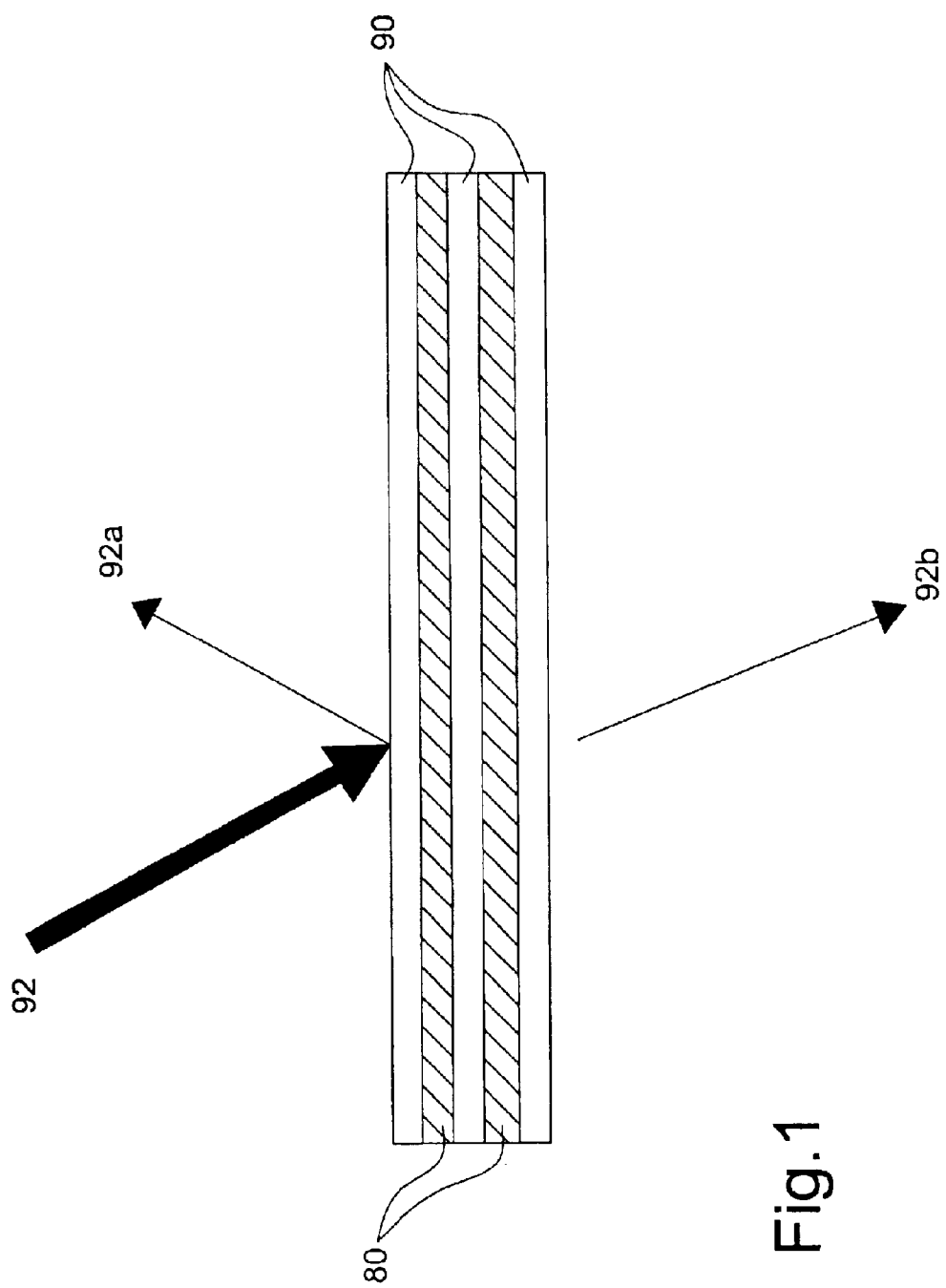
FIG. 1 is a cross sectional view of a portion of a dielectric multilayer according to a preferred embodiment of the present invention.

In the present invention, a dielectric multilayer is utilized as a transflective film to create a transflective LCD. The LCD is characterized in that the dielectric multilayer is formed inside an LCD cell. The dielectric multilayer is composed of multiple layers of transparent dielectric materials with different refractive index. Preferably, the dielectric multilayer comprises a plurality of transparent metal oxides layers. The dielectric multilayer may include several or tens of layers, and each layer can be made from any of a number of different metal oxides. For ease of manufacture, the dielectric multilayer contains only a few different materials. For example, the dielectric multilayer shown in FIG. 1 consists of alternating layers of $TiO_2$ 80 and $SiO_2$ 90. As shown in FIG. 1, when an ambient light (incident light 92) traveling through the dielectric multilayer encounters the materials with different refractive index, a great part of the light is reflected to form a reflected light 92a while the other part is transmitted to form a transmitted ray 92b.

FIGS. 2–14 illustrate the transflective LCDs according to the preferred embodiments of the present invention, and similar components have been given the same reference numerals. These LCDs have a dielectric multilayer 110 formed inside an LCD cell 120 including a first substrate 130 and a second substrate 140 located facing each other with a liquid crystal layer 150 therebetween. In the preferred embodiments of the present invention, it is noted that the dielectric multilayer is disposed between the first substrate 130 and the liquid crystal layer 150 or between the second substrate 140 and the liquid crystal layer 150. The first substrate 130 is provided with a plurality of pixel regions arranged as a matrix. Each pixel region is provided with a thin film transistor (TFT) as a switching element, a pixel electrode 138 and a passivation layer 137 formed between the TFT and the pixel electrode. The passivation layer 137 has a plurality of contact holes 137a. The TFT comprises a gate electrode 132a, a semiconductor layer 139 and source/drain electrodes 134a, 134b. When a scanning signal is fed to a gate line, the thin film transistor is turned on to feed the data signal therethrough to the pixel electrode. The second substrate 140 is provided with a light-shielding matrix (such as black matrix BM 142), a color filter 144 for displaying colors and a transparent electrode 146 such as an ITO electrode as a common electrode. A first polarizer 160 which polarizes the visible light, a retardation film 170 such as an achromatic λ/4 retardation film, and a second polarizer 180 on the retardation film 170 are disposed outside of the LCD cell 120. A backlight 190 is provided behind the LCD cell 120. The typical backlight module includes an optical cavity and a lamp, LED or other structure that generates light.

Figure 14:
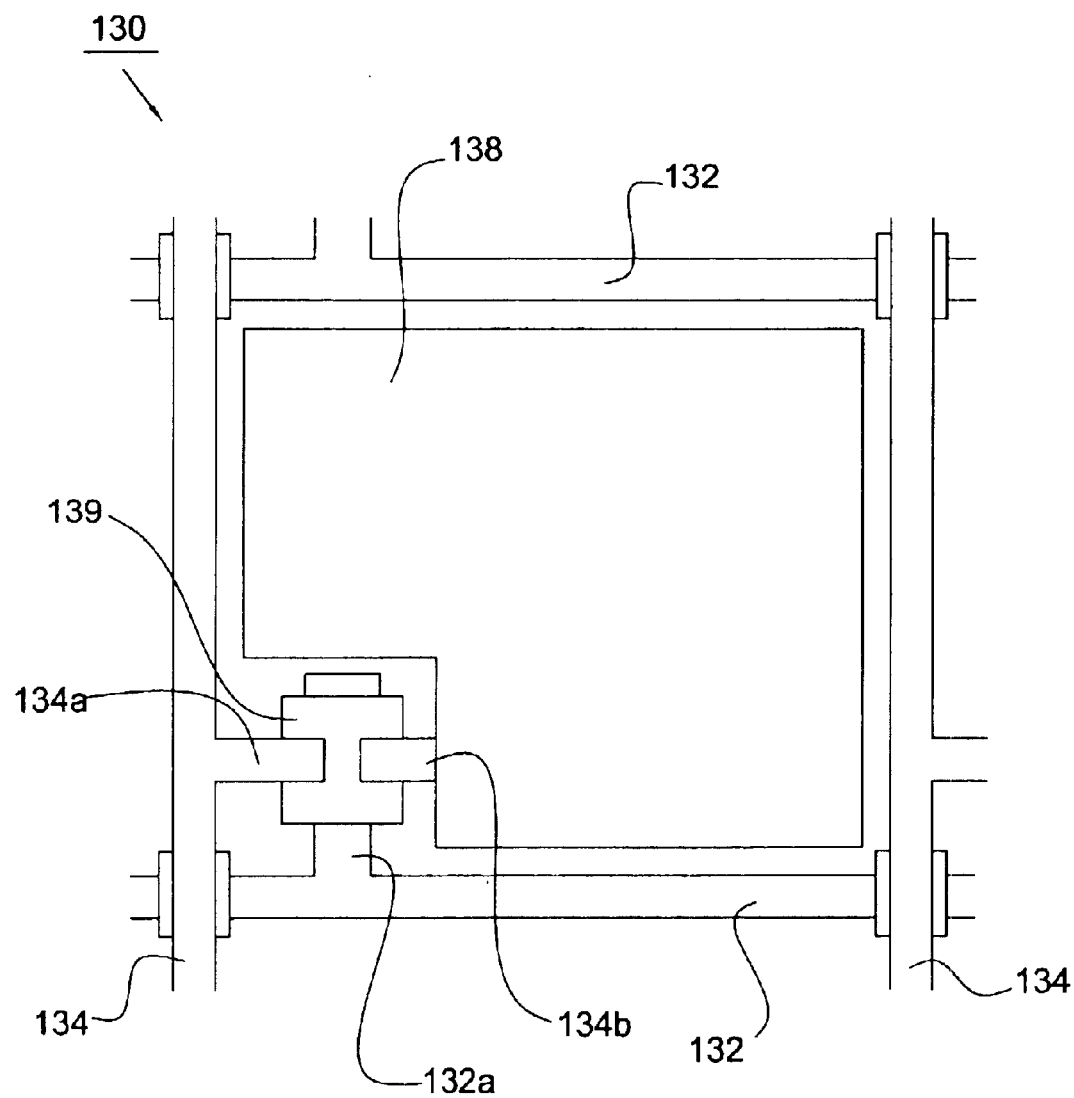
FIG. 14 shows, in a top plan view, a pixel region according to a preferred embodiment of the present invention.

Referring to FIG. 14, on the first substrate 130 formed a plurality of parallel gate lines 132 and a plurality of parallel data lines 134 perpendicular to the gate lines 132. The pixel region described above is a region which is surrounded by two adjacent gate lines 132 and two adjacent data lines 134. Although not shown, these gate lines 132 and data lines 134 are insulated from each other by an inter-layer insulating film.

Figure 2:
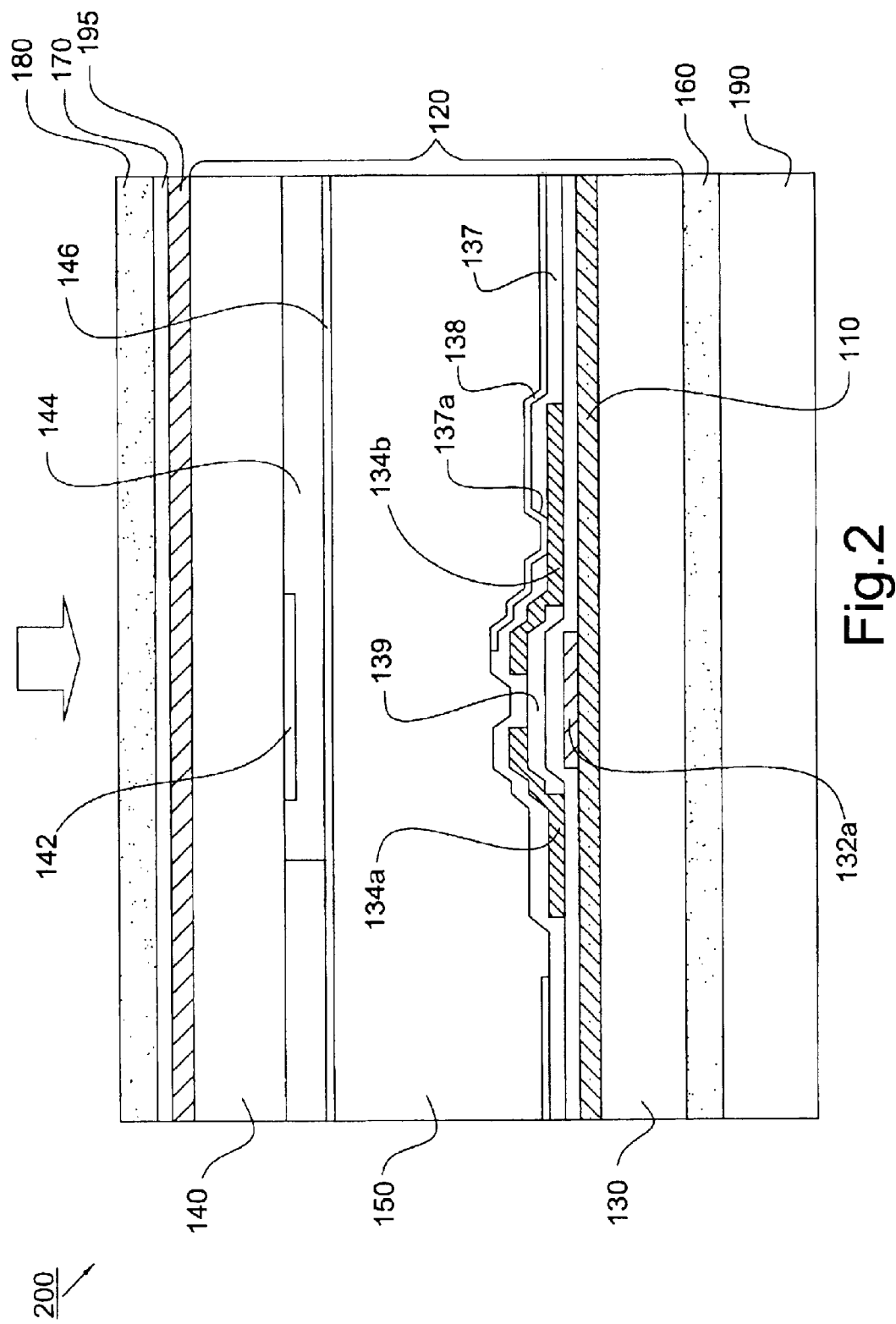
FIG. 2 is a cross sectional view of a portion of a transflective LCD according to a first preferred embodiment of the present invention.

FIG. 2 shows a transflective LCD 200 according to a first preferred embodiment of the present invention. The LCD 200 is characterized in that the dielectric multilayer 110 is directly formed on the inner surface of the first substrate 130, the gate lines 132 (not shown in FIG. 2) are formed on the dielectric multilayer 110, and the light source 190 is disposed behind the outer surface of the first substrate 130. The LCD 200 preferably includes a diffuser 195 that scatters light asymmetrically. Typically, the diffuser 195 comprises a transparent film and a plurality of transparent micro particles distributed in the transparent film wherein the refractive index of the transparent film is different from the refractive index of the transparent micro particles. The diffuser 195 is formed on the outer surface of the second substrate 140, and the retardation film 170 is formed on the diffuser 195.

Figure 3:
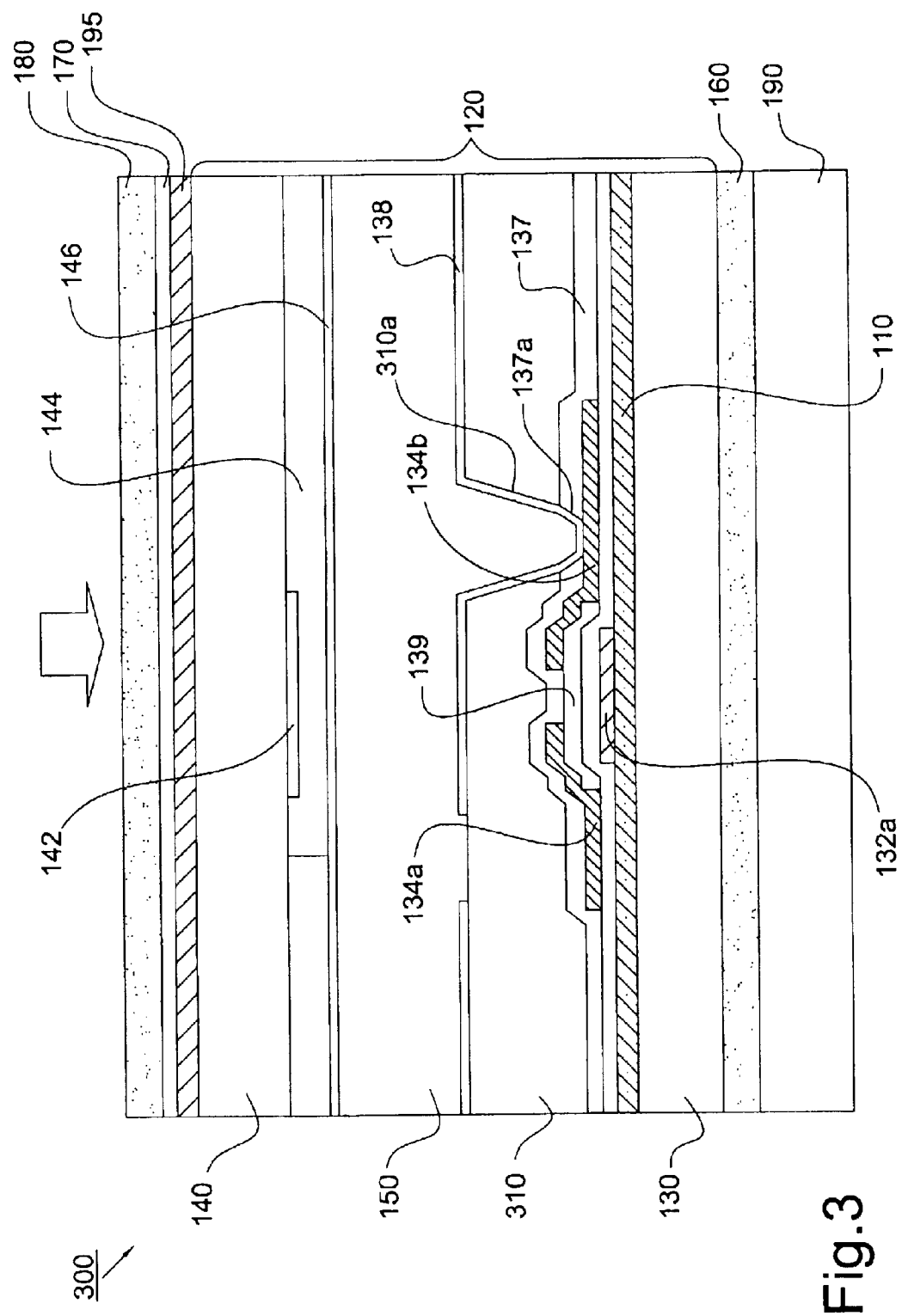
FIG. 3 is a cross sectional view of a portion of a transflective LCD according to a second preferred embodiment of the present invention.

FIG. 3 shows a transflective LCD 300 according to a second preferred embodiment of the present invention. The LCD 300 is substantially identical to the LCD 200 of FIG. 2 with an exception that the LCD 300 further comprises an overcoat layer 310 on the passivation layer 137. The overcoat layer 310 has a plurality of contact holes 310a (only one shown in FIG. 3) to expose the contact holes 137a (only one shown in FIG. 3) of the passivation layer 137. The pixel electrode 138 is formed on the overcoat layer 310 and electrically connected to the drain electrode 134b of the TFT through the contact hole 137a of the passivation layer 137 and the contact holes 310a of the overcoat layer 310.

Figure 4:
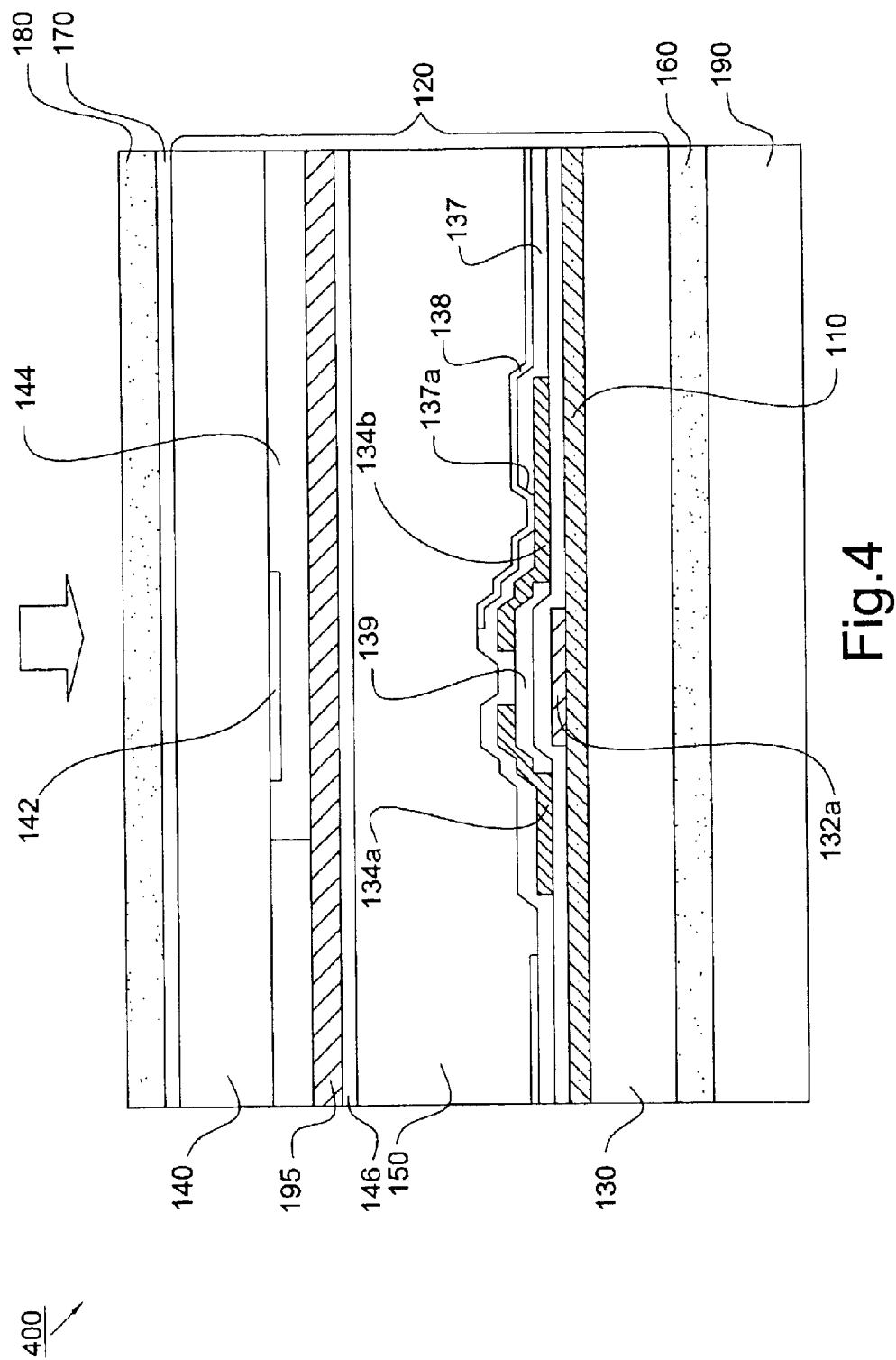
FIG. 4 is a cross sectional view of a portion of a transflective LCD according to a third preferred embodiment of the present invention.

FIG. 4 shows a transflective LCD 400 according to a third preferred embodiment of the present invention. The LCD 400 is substantially identical to the LCD 200 of FIG. 2 with the exceptions that the diffuser 195 is sandwiched between the common electrode 146 and the color filters 144, and the retardation film 170 is formed on the outer surface of the second substrate 140.

Figure 5:
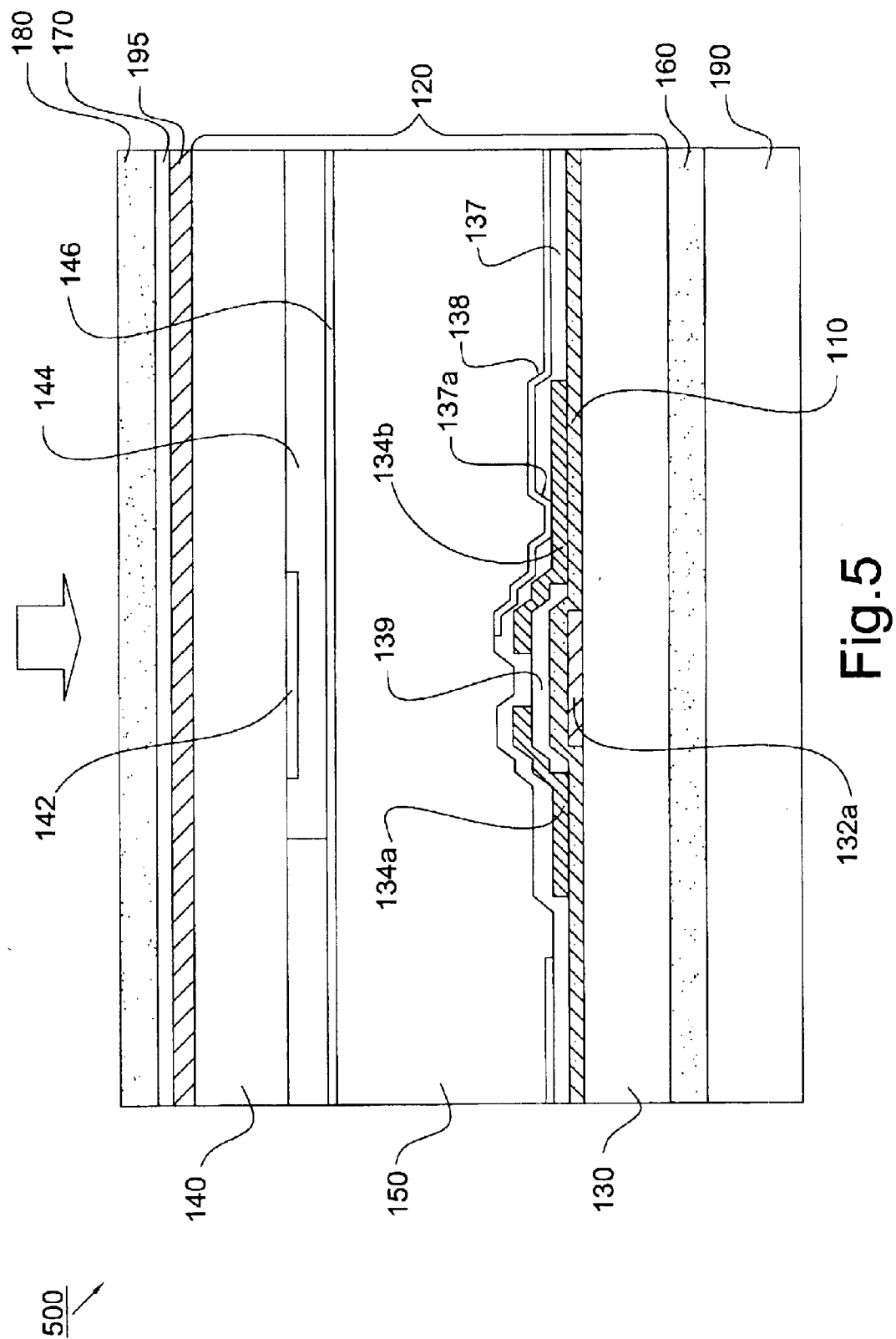
FIG. 5 is a cross sectional view of a portion of a transflective LCD according to a fourth preferred embodiment of the present invention.

FIG. 5 shows a transflective LCD 500 according to a fourth preferred embodiment of the present invention. The LCD 500 is characterized in that the dielectric multilayer 110 is formed on the gate lines 132 (not shown in FIG. 5) provided on the first substrate 130 as an insulating layer. Specifically, the gate electrode 132a and the gate line 132 (see FIG. 14) are formed by sputtering and patterning a metal on the upper surface of the first substrate 130. Then, the dielectric multilayer 110 is formed over the gate lines 132 as an insulating layer used in place of conventional gate nitride. Next, the semiconductor layer 139 (such as an amorphous silicon layer) and a contact layer (not shown) are formed by depositing amorphous silicon on the dielectric multilayer 110, and patterning amorphous silicon and doping amorphous silicon, respectively. Thereafter, the data lines 134, the source/drain electrodes 134a, 134b, the passivation layer 137 and the pixel electrodes 138 are formed using conventional processes.

Figure 6:
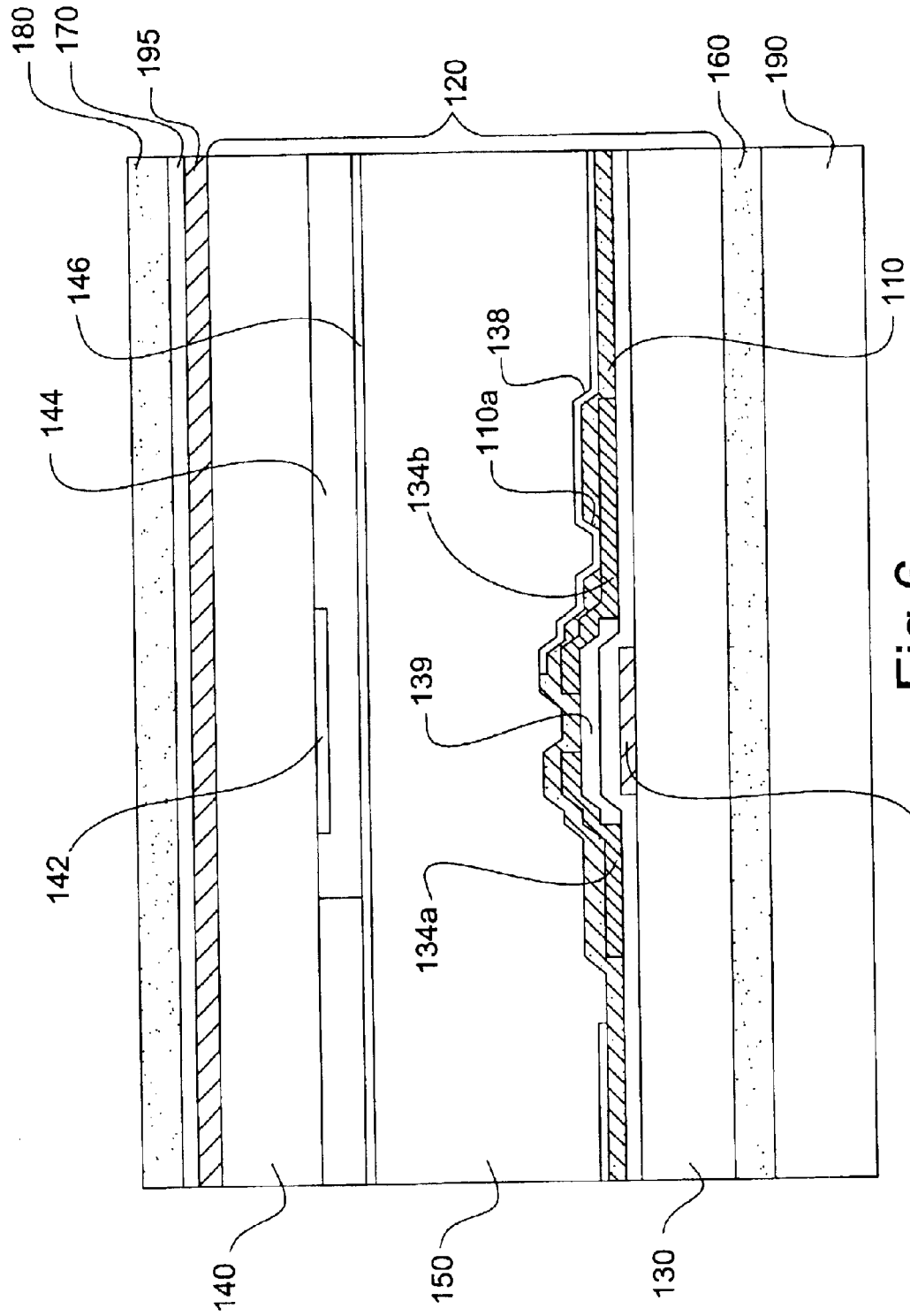
FIG. 6 is a cross sectional view of a portion of a transflective LCD according to a fifth preferred embodiment of the present invention.

FIG. 6 shows a transflective LCD 600 according to a fifth preferred embodiment of the present invention. The LCD 600 is characterized in that the dielectric multilayer 110 is formed between the switching elements, e.g., the TFTs and the pixel electrodes 138 as a passivation layer. The dielectric multilayer 110 has a plurality of contact holes 110a (only one shown in FIG. 6), and the pixel electrode 138 is electrically connected to the drain electrode 134b of the TFT through the contact hole 110a of the dielectric multilayer 110. Specifically, after forming the data lines 134 (see FIG. 14) and source/drain electrodes 134a, 134b by sputtering and patterning a metal, the dielectric multilayer 110 is formed over the entire surface of the first substrate 130. The contact hole 110a is formed by opening and patterning a part of the dielectric multilayer 110 on the drain electrode 134b.

Figure 7:
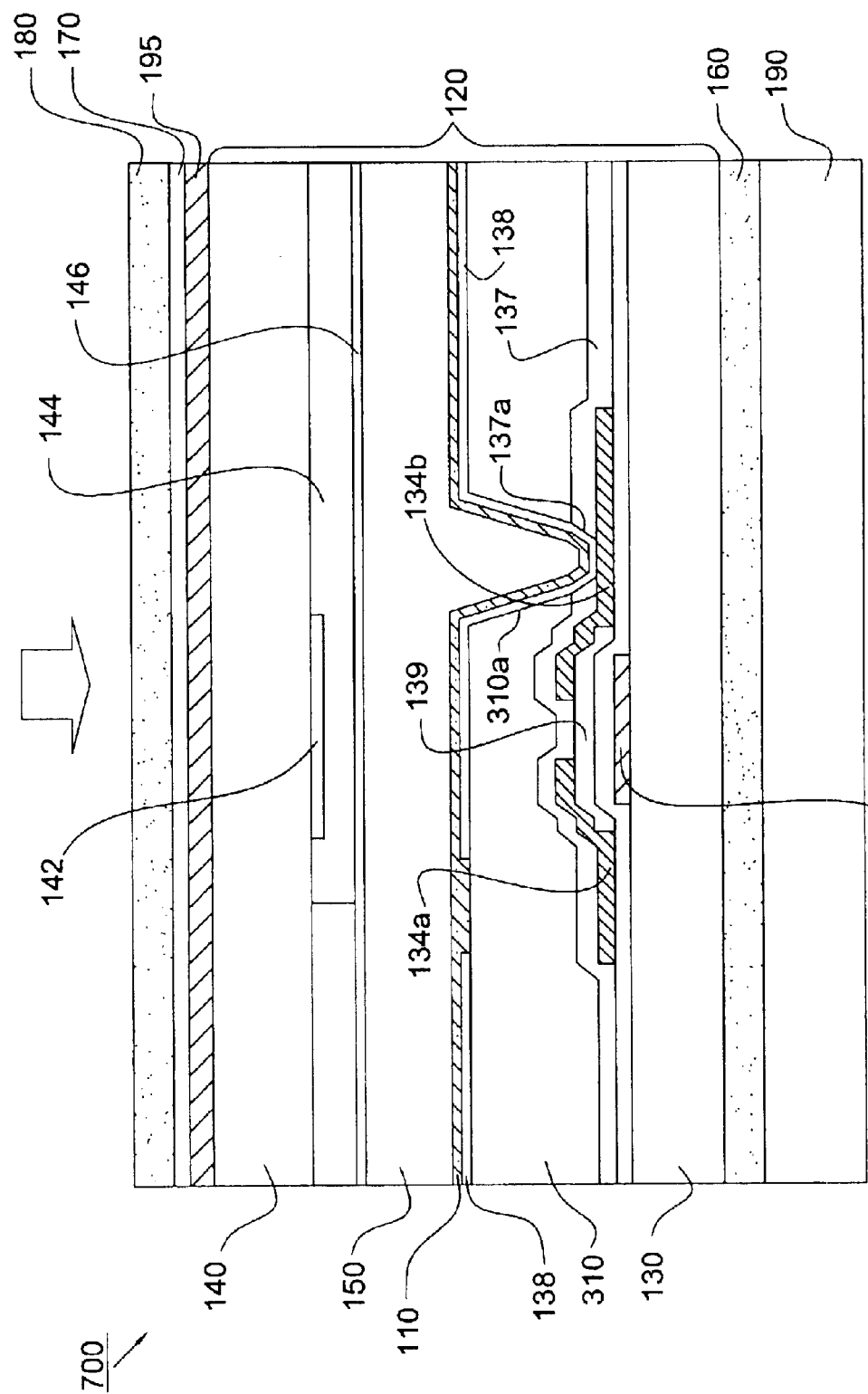
FIG. 7 is a cross sectional view of a portion of a transflective LCD according to a sixth preferred embodiment of the present invention.

FIG. 7 shows a transflective LCD 700 according to a sixth preferred embodiment of the present invention. The LCD 700 is characterized in that the dielectric multilayer 110 is formed on an overcoat layer 310 and the pixel electrodes 138. The overcoat layer 310 is formed on the passivation layer 137. The overcoat layer 310 has a plurality of contact holes 310a (only one shown in FIG. 7) to expose the contact holes 137a (only one shown in FIG. 7) of the passivation layer. The pixel electrodes 138 are formed between the overcoat layer 310 and the dielectric multilayer 110. The pixel electrode 138 is electrically connected to the drain electrode 134b of the TFT through the contact hole 137a of the passivation layer 137 and the contact holes 310a of the overcoat layer 310.

Figure 8:
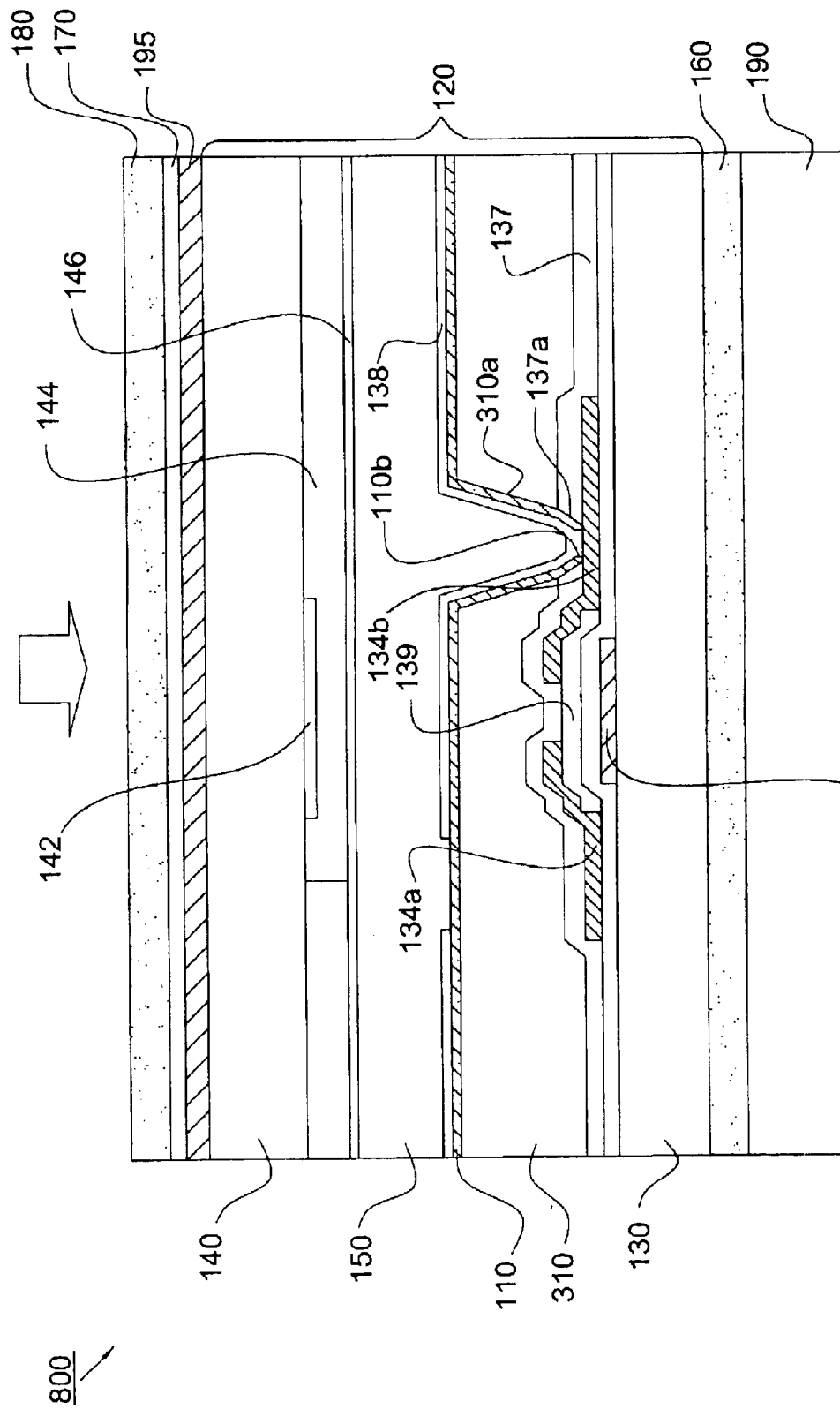
FIG. 8 is a cross sectional view of a portion of a transflective LCD according to a seventh preferred embodiment of the present invention.

FIG. 8 shows a transflective LCD 800 according to a seventh preferred embodiment of the present invention. The LCD 800 is characterized in that the dielectric multilayer 110 is formed on an overcoat layer 310 and has a plurality of contact holes 110b formed corresponding to the contact holes 137a of the passivation layer. The overcoat layer 310 has an upper surface closest to the liquid crystal layer 150 and is formed on the passivation layer 137 in a manner that the upper surface of the overcoat layer 310 is substantially flat. The overcoat layer 310 has a plurality of contact holes 310a (only one shown in FIG. 8) to expose the contact holes 137a (only one shown in FIG. 8) of the passivation layer. The pixel electrode 138 is formed on the dielectric multilayer 110 and electrically connected to the drain electrode 134b of the TFT through the contact holes 110b of the dielectric multilayer 110.

According to the present invention, the transflective LCDs 500, 600, 700, 800 described above preferably include a diffuser 195 that scatters light asymmetrically. In these embodiments, the diffuser 195 is formed on the outer surface of the second substrate 140, the retardation film 170 is formed on the diffuser 195, and the light source 190 is disposed behind the first substrate 130.

Figure 9:
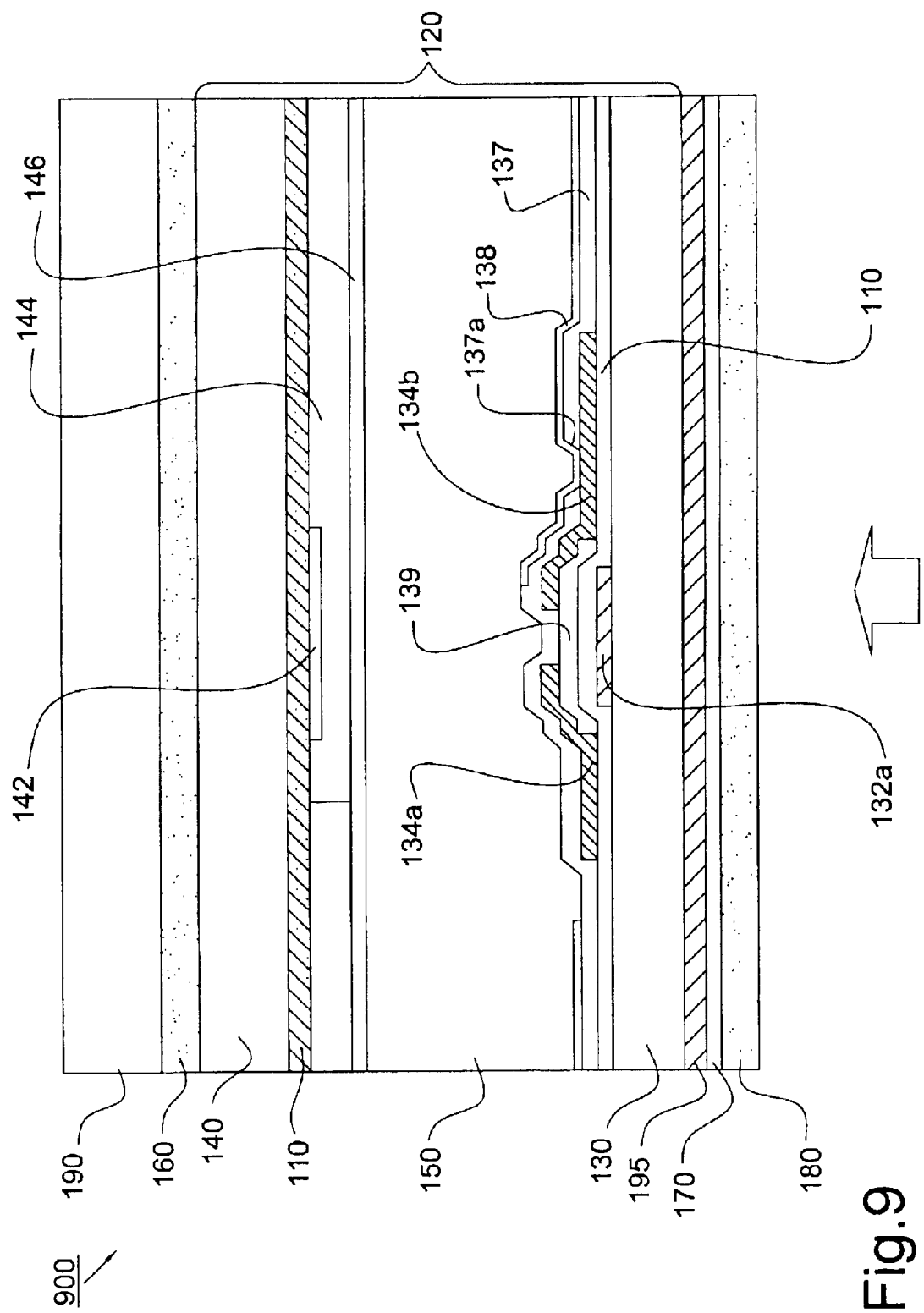
FIG. 9 is a cross sectional view of a portion of a transflective LCD according to a eighth preferred embodiment of the present invention.

FIG. 9 shows a transflective LCD 900 according to an eighth preferred embodiment of the present invention. The LCD 900 is characterized in that the dielectric multilayer 110 is formed on the inner surface of the second substrate 140, the first polarizer 160 is formed on the outer surface of the second substrate 140, and the light source 190 is behind the second substrate 140. The first polarizer 160 and the light source 190 are located on the same side of the second substrate 140. The LCD 900 preferably includes a diffuser 195 that scatters light asymmetrically. The diffuser 195 is formed on the outer surface of the first substrate 130, and the retardation film 170 is formed on the diffuser 195.

Figure 10:
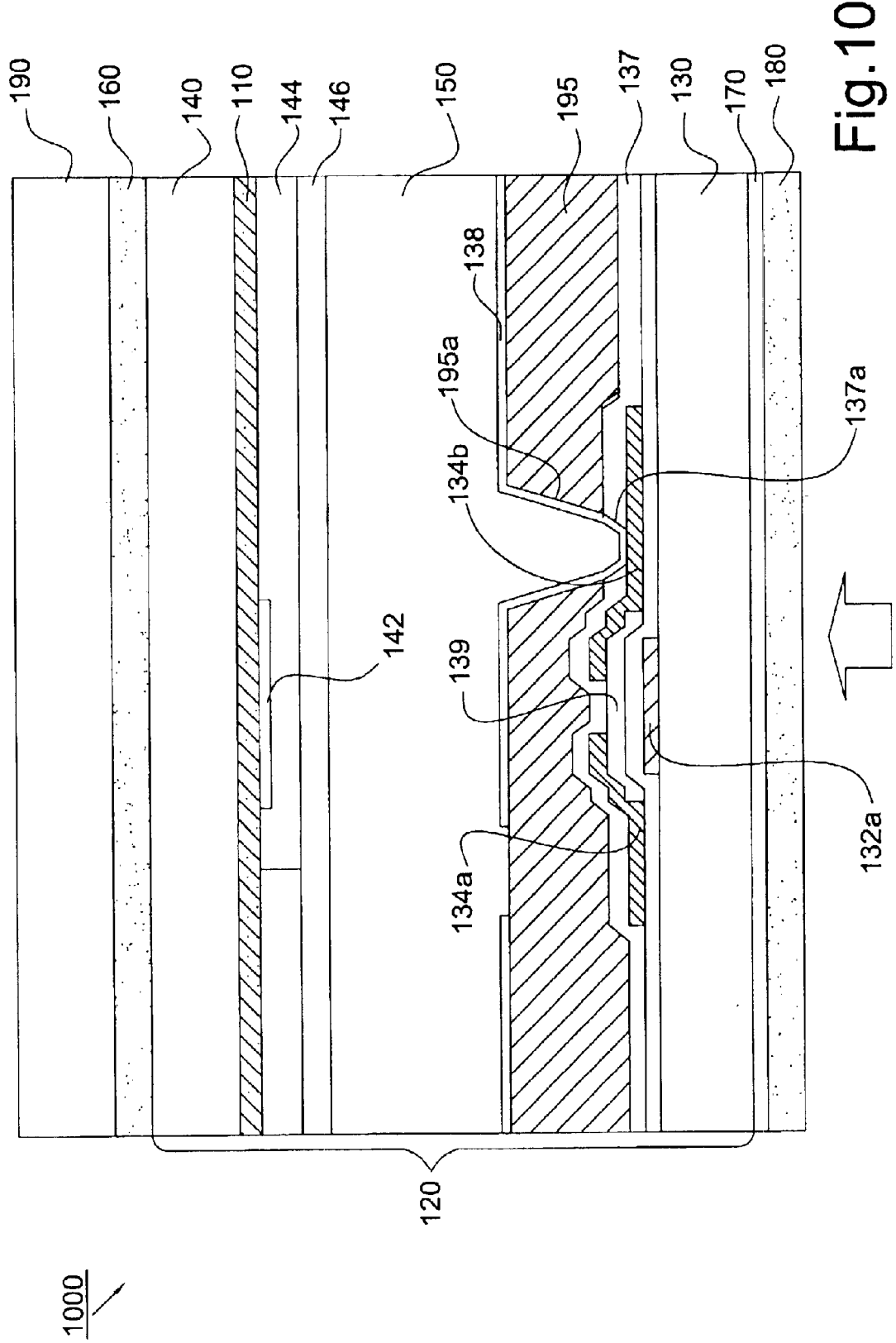
FIG. 10 is a cross sectional view of a portion of a transflective LCD according to a ninth preferred embodiment of the present invention.

FIG. 10 shows a transflective LCD 1000 according to a ninth preferred embodiment of the present invention. The LCD 1000 is substantially identical to the LCD 900 of FIG. 9 with the exceptions that the diffuser 195 is sandwiched between the pixel electrodes 138 and the passivation layer 137, and the retardation film 170 is directly formed on the outer surface of the first substrate 130. The diffuser 195 has a plurality of contact holes 195b (only one shown in FIG. 10) to expose the contact holes 137a (only one shown in FIG. 10) of the passivation layer. The pixel electrode 138 is formed on the diffuser 195 and electrically connected to the drain electrode 134b of the TFT through the contact hole 137a of the passivation layer 137 and the contact hole 195b of the diffuser 195.

Figure 11:
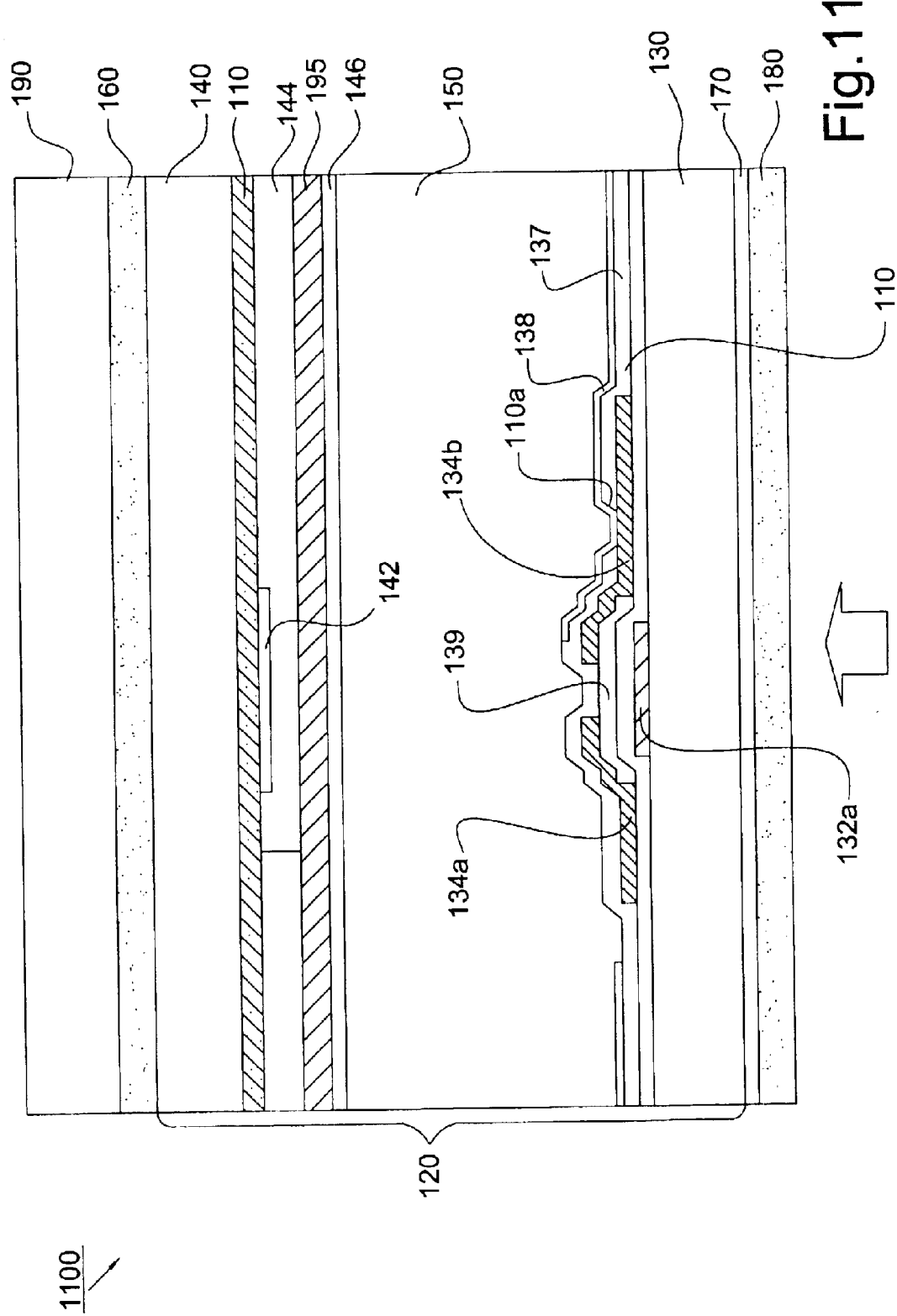
FIG. 11 is a cross sectional view of a portion of a transflective LCD according to a tenth preferred embodiment of the present invention.

FIG. 11 shows a transflective LCD 1100 according to a tenth preferred embodiment of the present invention. The LCD 1100 is substantially identical to the LCD 900 of FIG. 9 with the exceptions that the diffuser 195 is sandwiched between the common electrode 146 and the color filters 144, and the retardation film 170 is formed on the outer surface of the first substrate 130.

Figure 12:
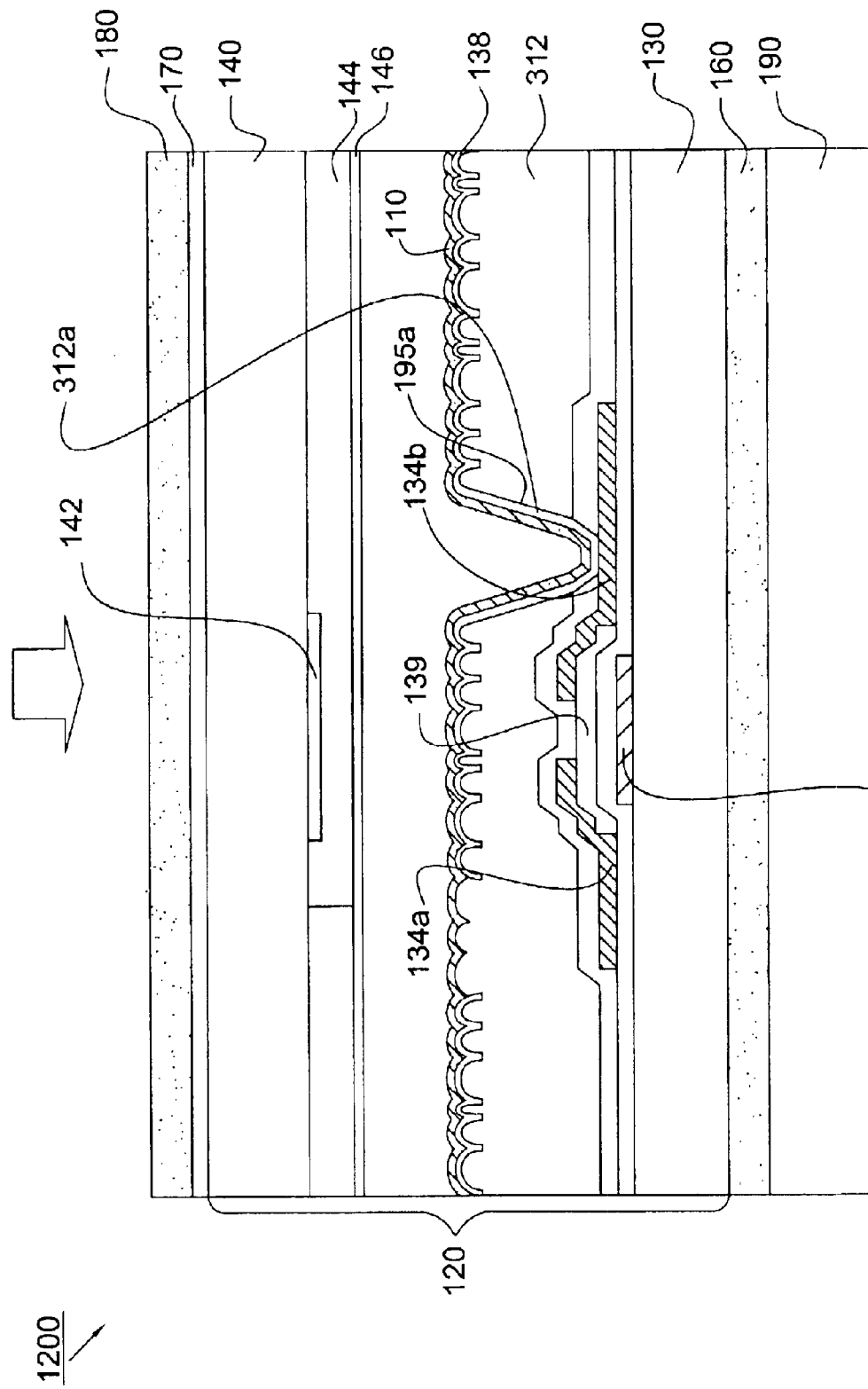
FIG. 12 is a cross sectional view of a portion of a transflective LCD according to a eleventh preferred embodiment of the present invention.

FIG. 12 shows a transflective LCD 1200 according to an eleventh preferred embodiment of the present invention. The LCD 1200 is characterized in that the dielectric multilayer 110 is formed on an overcoat layer 312 with an uneven surface closest to the liquid crystal layer and the pixel electrodes 138. The overcoat layer 312 is formed on the passivation layer 137. As shown, the uneven surface of the overcoat layer 312 preferably has some fine corrugated (concave or convex) portions in order to increase reflection rate in directions other than the angle of mirror reflection. The dielectric multilayer 110 is formed on the corrugated surface of the overcoat layer 312 such that the surface of the dielectric multilayer 110 is provided with the corrugated surface acting as a reflective surface. Alternatively, the overcoat layer 312 may be provided with slanted micro prism array (not shown) acting as the uneven surface. It should be understood that the overcoat layer 312 has a plurality of contact holes 312a to expose the contact holes 137a of the passivation layer. The pixel electrode 138 is formed on the uneven surface of the overcoat layer 312 and electrically connected to the drain electrode 134b of the TFT through the contact hole 137a of the passivation layer 137 and the contact hole 312a of the overcoat layer 312.

Figure 13:
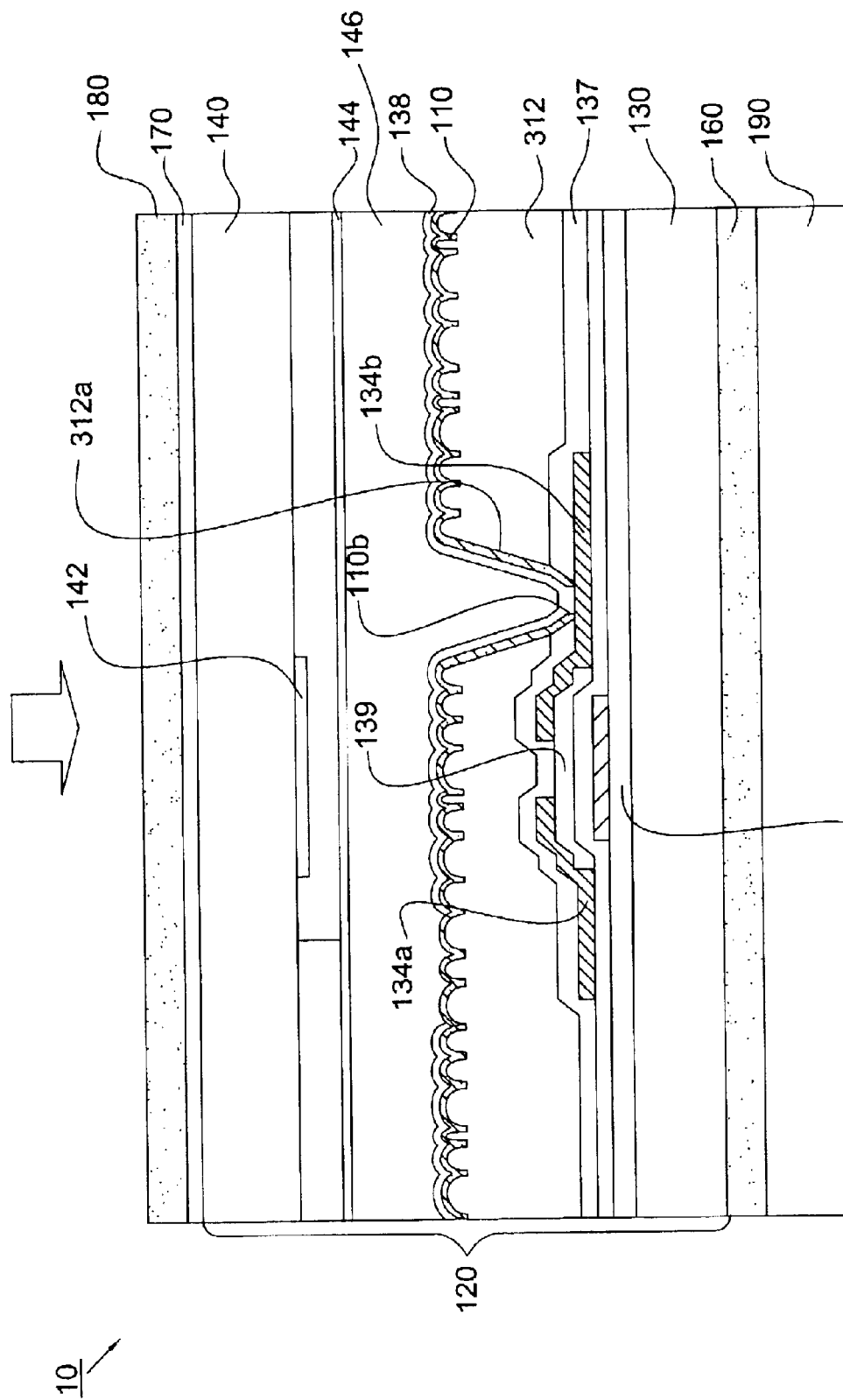
FIG. 13 is a cross sectional view of a portion of a transflective LCD according to a twelfth preferred embodiment of the present invention.

FIG. 13 shows a transflective LCD 1300 according to a twelfth preferred embodiment of the present invention. The LCD 1300 is characterized in that the dielectric multilayer 110 is directly formed on an overcoat layer 312 with an uneven surface closest to the liquid crystal layer. The dielectric multilayer 110 has a plurality of contact holes 110b (only one shown in FIG. 13) formed corresponding to the contact holes 137a (only one shown in FIG. 13) of the passivation layer 137. The pixel electrode 138 is electrically connected to the drain electrode 134b of the TFT through the contact hole 110b of the dielectric multilayer 110.

Figure 15:
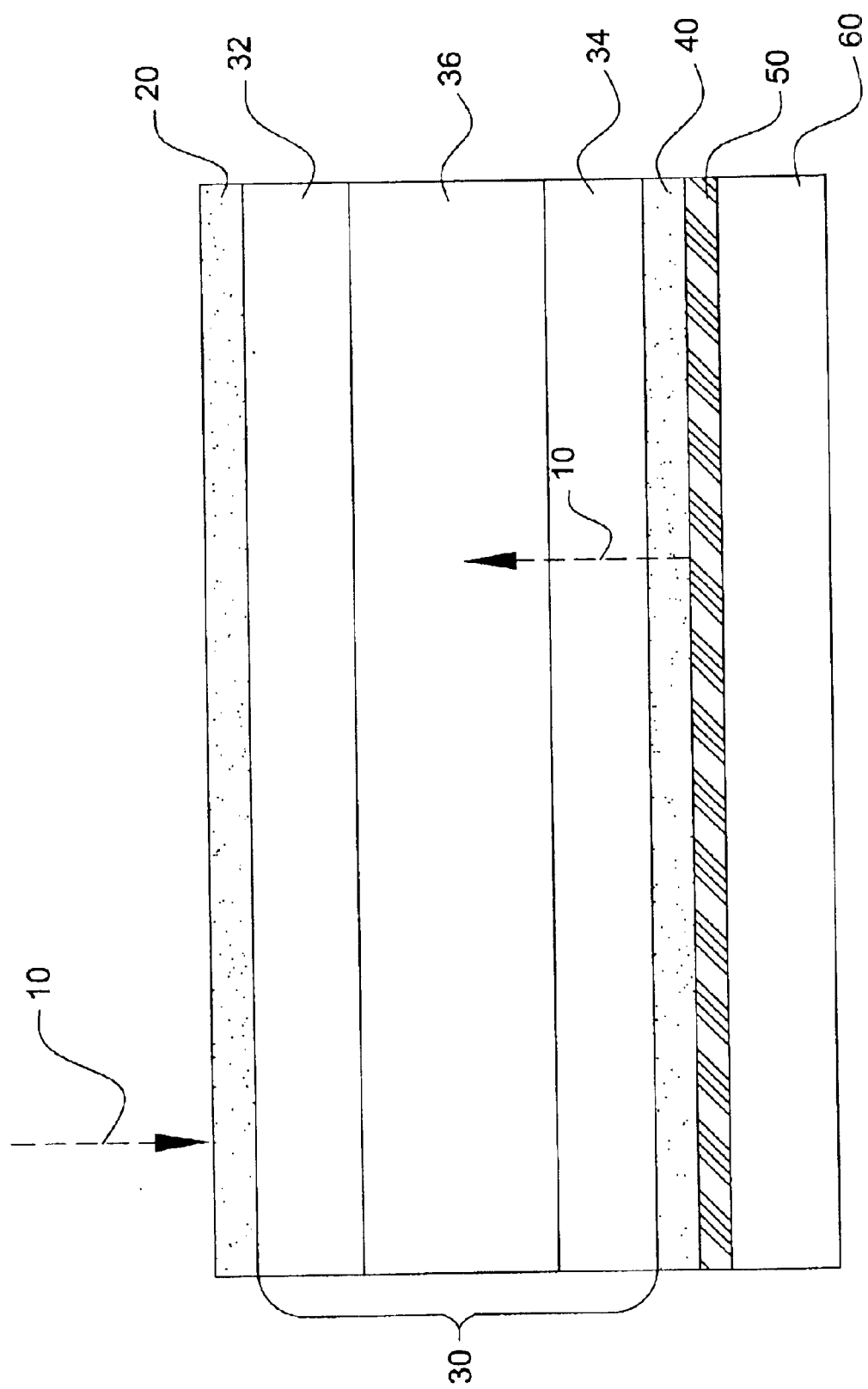
FIG. 15 is a cross sectional view of a portion of a conventional transflective LCD.

In the transflective LCDs according to the present invention, a dielectric multilayer which passes light in the transmissive state and reflects ambient light in the reflective state is formed inside the LCD cell. It is noted that the dielectric multilayer 110 is disposed between the first substrate 130 and the liquid crystal layer 150 or between the second substrate 140 and the liquid crystal layer 150. Accordingly, in the reflective state, the light only passes through the polarizer 180 twice without passing through the polarizer 160. Therefore, a high resolution image of outstanding brightness is generated by the transflective LCDs according to the present invention when ambient light is incident on the surface of the dielectric multilayer or when light is generated by the light source. On the other hand, in the conventional transflective LCD shown in FIG. 15, the light passes through both of the polarizers 20 and 40 twice in the reflective mode. Consequently, in the reflective mode, extra-absorption of the polarizer 40 will adversely affect the illumination efficiency of the conventional transflective LCD. Therefore, comparing to the conventional transflective LCD, the transflective LCDs according to the present invention provide higher efficiency while meeting the need for low power consumption.

Although the invention has been explained in relation to its preferred embodiment, it is to be understood that many other possible modifications and variations can be made without departing from the spirit and scope of the invention as hereinafter claimed.

What is claimed is:

1. A liquid crystal display comprising:
   a first substrate;
   a second substrate;
   a liquid crystal and a dielectric multilayer formed between the first and the second substrates, the dielectric multilayer having at least two layers of dielectric materials with different refractive index;
   the dielectric multilayer being formed on the first substrate;
   a plurality of gate lines formed parallel to one another on the dielectric multilayer;
   a plurality of data lines formed parallel to one another vertically to the gate lines, the gate lines and the data lines being arranged to form a matrix of pixel regions with each of the pixel regions bounded by two adjacent gate lines and two adjacent data lines;
   a pixel electrode in each of the pixel regions; and
   a plurality of switching elements electrically connected to the pixel electrodes being formed at the intersections of the gate lines and data lines.

2. The liquid crystal display as claimed in claim 1, further comprising two polarizers on outer surfaces of the first and the second substrates, and a diffuser and a retardation film sandwiched between the polarizer and the second substrate wherein the retardation film is sandwiched between the diffuser and the polarizer.

3. The liquid crystal display as claimed in claim 2, further comprising
   a passivation layer on the switching elements and the data lines, the passivation layer having a plurality of first contact holes; and
   an overcoat layer being formed on the passivation layer and having a plurality of second contact holes to expose the first contact holes of the passivation layer,
   wherein the pixel electrode is formed on the overcoat layer and electrically connected to the switching element through the first contact hole of the passivation layer and the second contact hole of the overcoat layer.

4. The liquid crystal display as claimed in claim 1, further comprising two polarizers on outer surfaces of the first and the second substrates, and a retardation film sandwiched between the polarizer and the second substrate, wherein the liquid crystal display further comprises:
   a light-shielding matrix formed on the second substrate;
   a plurality of color filters on the light-shielding matrix;
   a common electrode, and
   a diffuser sandwiched between the color filters and the common electrode.

5. A liquid crystal display comprising:
   a first substrate;
   a second substrate;
   a liquid crystal layer and a dielectric multilayer formed between the first and the second substrates, the dielectric multilayer having at least two layers of dielectric materials with different refractive index;
   the dielectric multilayer being disposed between the first substrate and the liquid crystal layer;
   two polarizers on outer surfaces of the first and the second substrates; and
   a diffuser and a retardation film sandwiched between the polarizer and the second substrate wherein the retardation film is sandwiched between the diffuser and the polarizer.

6. The liquid crystal display as claimed in claim 5, further comprising:
   a plurality of gate lines formed one another on the first substrate;
   a plurality of data lines formed parallel to one another vertically to the gate lines, the gate lines and the data lines being arranged to form a matrix of pixel regions with each of the pixel regions bounded by two adjacent gate lines and two adjacent data lines;
   a pixel electrode in each of the pixel regions; and
   a plurality of switching elements being formed at intersections of the gate lines and data lines and being electrically connected to the pixel electrodes,
   wherein the dielectric multilayer is formed on the gate lines as an insulating layer.

7. The liquid crystal display as claimed in claim 5, further comprising:
   a plurality of gate lines formed parallel to one another on the first substrate;
   a plurality of data lines formed parallel to one another vertically to the gate lines, the gate lines and the data lines being arranged to form a matrix of pixel regions with each of the pixel regions defined by two adjacent gate lines and two adjacent data lines;
   a plurality of switching elements electrically connected to the pixel electrode and being formed around the intersections of the gate lines and data lines; and
   a pixel electrode formed in each of the pixel regions,
   wherein the dielectric multilayer is formed between the switching elements and the pixel electrode as a passivation layer, the dielectric multilayer has a plurality of contact holes, and the pixel electrode is electrically connected to the switching element through the contact hole of the dielectric multilayer.

8. The liquid crystal display as claimed in claim 5, further comprising:
   a plurality of gate lines formed parallel to one another on the first substrate;
   a plurality of data lines formed parallel to one another vertically to the gate lines, the gate lines and the data lines being arranged to form a matrix of pixel regions with each of the pixel regions bounded by two adjacent gate lines and two adjacent data lines;
   a plurality of switching elements being formed at intersections of the gate lines and data lines;
   a passivation layer on the switching elements and the data lines, the passivation layer having a plurality of first contact holes; and
   an overcoat layer being formed on the passivation layer and having a plurality of second contact holes to expose the first contact holes of the passivation layer, and
   a pixel electrode in each of the pixel regions, the pixel electrode being formed on the overcoat layer and electrically connected to the switching element through the first contact hole of the passivation layer and the second contact hole of the overcoat layer,
   wherein the dielectric multilayer is formed, on the overcoat layer and the pixel electrode.

9. The liquid crystal display as claimed in claim 5, further comprising:
   a plurality of gate lines formed parallel to one another on the first substrate;
   a plurality of data lines formed parallel to one another vertically to the gate lines, the gate lines and the data lines being arranged to form a matrix of pixel regions with each of the pixel regions bounded by two adjacent gate lines and two adjacent data lines;

a plurality of switching elements being formed at intersections of the gate lines and data lines;

a passivation layer on the switching elements and the data lines, the passivation layer having a plurality of first contact holes;

an overcoat layer being formed on the passivation layer and having a plurality of second contact holes to expose the first contact holes of the passivation layer, wherein the dielectric multilayer is formed on the overcoat layer and has a plurality of third contact holes formed corresponding to the first contact holes of the passivation layer; and a pixel electrode in each of the pixel regions, the pixel electrode being formed on the dielectric multilayer and electrically connected to the switching element through the third contact hole of the dielectric multilayer.

10. A liquid crystal display comprising:

a first substrate, a second substrate;

a liquid crystal layer and a dielectric multilayer formed between the first and the second substrates, the dielectric multilayer having at least two layers of dielectric materials with different refractive index;

a plurality of gate lines formed parallel to one another on the first substrate;

a plurality of data lines formed parallel to one another vertically to the gate lines, the gate lines and the data lines being arranged to form a matrix of pixel regions with each of the pixel regions bounded by two adjacent gate lines and two adjacent data lines;

a plurality of switching elements being formed at intersections of the gate lines and data lines;

a passivation layer on the switching elements and the data lines, the passivation layer having a plurality of first contact holes;

an overcoat layer having an uneven surface closest to the liquid crystal layer, the overcoat layer having a plurality of second contact holes to expose the first contact holes of the passivation layer and being formed on the passivation layer; and a pixel electrode in each of the pixel regions, the pixel electrode being formed on the uneven surface of the overcoat layer and electrically connected to the switching element through the first contact hole of the passivation layer and the second contact hole of the overcoat layer, wherein the dielectric multilayer is formed on the overcoat layer and the pixel electrode such that the surface of the dielectric multilayer is uneven.

11. The liquid crystal display as claimed in claim 10, further comprising two polarizers on outer surfaces of the first and the second substrates, and a retardation film sandwiched between the polarizer and the second substrate.

12. The liquid crystal display as claimed in claim 10, wherein the uneven surface of the overcoat layer is a corrugated surface, and the dielectric multilayer is formed on the overcoat layer and the pixel electrode such that the surface of the dielectric multilayer is corrugated.

13. A liquid crystal display comprising:

a first substrate;

a second substrate;

a liquid crystal layer and a dielectric multilayer formed between the first and the second substrates, the dielectric multilayer having at least two layers of dielectric materials with different refractive index, the dielectric multilayer being disposed between the first substrate and the liquid crystal layer, a plurality of gate lines formed parallel to one another on the first substrate;

a plurality of data lines formed parallel to one another vertically to the gate lines, the gate lines and the data lines being arranged to form a matrix of pixel regions with each of the pixel regions bounded by two adjacent gate lines and two adjacent data lines;

a plurality of switching elements being formed at intersections of the gate lines and data lines;

a passivation layer on the switching elements and the data lines, the passivation layer having a plurality of first contact holes;

an overcoat layer having an uneven surface closest to the liquid crystal layer, the overcoat layer having a plurality of second contact holes to expose the first contact holes of the passivation layer and being formed on the passivation layer; and a pixel electrode in each of the pixel regions, wherein the dielectric multilayer is formed on the overcoat layer such that the surface of the dielectric multilayer is uneven, the dielectric multilayer has a plurality of third contact holes formed corresponding to the second contact holes of the overcoat layer, and the pixel electrode is formed on the dielectric multilayer and electrically connected to the switching element through the third contact hole of the dielectric multilayer.

14. The liquid crystal display as claimed in claim 13, further comprising two polarizers on outer surfaces of the first and the second substrates, and a retardation film sandwiched between the polarizer and the second substrate.

15. The liquid crystal display as claimed in claim 13, wherein the uneven surface of the overcoat layer is a corrugated surface, and the dielectric multilayer is formed on the overcoat layer such that the surface of the dielectric multilayer is corrugated.

16. A liquid crystal display comprising:

a first substrate;

a second substrate;

a liquid crystal layer and a dielectric multilayer formed between the first and the second substrates, the dielectric multilayer having at least two layers of dielectric materials with different refractive index;

the dielectric multi layer being formed on the second substrate;

a light-shielding matrix formed on the dielectric multilayer;

a plurality of color filters on the light-shielding matrix and the dielectric multilayer; and a common electrode.

17. The liquid crystal display as claimed in claim 16, further comprising two polarizers on outer surfaces of the first and the second substrates, a diffuser and a retardation film sandwiched between the polarizer and the second substrate wherein the retardation film is sandwiched between the diffuser and the polarizer.

18. The liquid crystal display as claimed in claim 16, further comprising:

two polarizers on outer surfaces of the first and the second substrates;

a retardation film sandwiched between the polarizer and the second substrate;

a plurality of gate lines formed parallel to one another on the first substrate;

a plurality of data lines formed parallel to one another vertically to the gate lines, the gate lines and the data lines being arranged to form a matrix of pixel regions with each of the pixel regions bounded by two adjacent gate lines and two adjacent data lines;

a plurality of switching elements being formed at intersections of the gate lines and data lines;

a passivation layer on the switching elements and the data lines, the passivation layer having a plurality of first contact holes;

a diffuser layer being formed on the passivation layer and having a plurality of second contact holes to expose the first contact holes of the passivation layer; and a pixel electrode in each of the pixel regions, the pixel electrode being formed on the diffuser layer and electrically connected to the switching element through the first contact hole of the passivation layer and the second contact hole of the diffuser layer.

19. The liquid crystal display as claimed in claim 16, further comprising two polarizers on outer surfaces of the first and the second substrates, a retardation film sandwiched between the polarizer and the first substrate, and a diffuser sandwiched between the color filters and the common electrode.

* * * * *